United States Patent
Blott et al.

(10) Patent No.: US 8,374,958 B2
(45) Date of Patent: Feb. 12, 2013

(54) METHOD AND APPARATUS FOR THE PAYMENT OF INTERNET CONTENT

(75) Inventors: Stephen Michael Blott, Gillette, NJ (US); Henry F Korth, Lower Gwynedd, PA (US); Clifford E Martin, Martinsville, NJ (US)

(73) Assignee: Alcatel Lucent, Paris (FR)

( * ) Notice: Subject to any disclaimer, the term of this patent is extended or adjusted under 35 U.S.C. 154(b) by 1954 days.

(21) Appl. No.: 10/230,444

(22) Filed: Aug. 29, 2002

(65) Prior Publication Data
US 2004/0044622 A1    Mar. 4, 2004

(51) Int. Cl.
*G06Q 40/00* (2012.01)
(52) U.S. Cl. .......................... 705/40; 382/100
(58) Field of Classification Search ................ 705/1–50; 707/1; 709/207–224; 725/1–51; 390/252–352
See application file for complete search history.

(56) References Cited

U.S. PATENT DOCUMENTS

| | | | | |
|---|---|---|---|---|
| 5,577,042 A * | 11/1996 | McGraw et al. | | 370/257 |
| 2002/0042778 A1 * | 4/2002 | Nel | | 705/42 |
| 2002/0091663 A1 * | 7/2002 | Mikami et al. | | 707/1 |
| 2002/0099671 A1 * | 7/2002 | Mastin Crosbie et al. | | 705/500 |
| 2002/0120567 A1 * | 8/2002 | Caplan et al. | | 705/40 |
| 2004/0044622 A1 * | 3/2004 | Blott et al. | | 705/40 |

OTHER PUBLICATIONS

Eino Kivisaari, Content-based Pricing of Services in the (Mobile) Internet, Mar. 21, 2003, Helsinki Unversity of Technology, web, 1-5.*
Blott et al., U.S. Appl. No. 09/315,636, May 20, 1999.
http://www.passport.com, Microsoft®.NET Passport: "One Easy Way to Shop Online", 1999.
http://www.moremagic.com, MoreMagic™, 2002.
http://www.ipin.com, IPN, Inc., 2002.
Yi-Jen Chiang, et al., "Dynamic Algorithms in Computational Geometry", Proceedings of the IEEE, Special Issue on Computational Geometry, 80(9):1412-1434, 1992.
E.M. McCreight, "Priority Search Trees", SIAM Journal of Computing, vol. 14, No. 2, pp. 257-276, 1985.

* cited by examiner

*Primary Examiner* — Marissa Liu
(74) *Attorney, Agent, or Firm* — Wolff & Samson PC

(57) ABSTRACT

A payment system for accessing Internet content is located within an Internet service providers network. The system includes an access controller (106) and a payment authority (108). When an end-user makes a request for a URL, the access controller terminates the request and determines whether the requested URL is one for which a charge for accessing the content referenced by that URL is required. That determination is made by comparing the requested URL with a set of rules that are supplied by all the content providers for which the service provider supports payment. If no match is found, the request is forwarded to the content provider. If a rule is found that matches the requested URL, the end-user is identified and the request is forwarded to the payment authority where a payment policy associated with the matched rule is applied. If the end-user fulfills the requirements of this payment policy, then access to the content is granted. The end-user may fulfill the requirements of the payment policy, for example, through a current subscription to a content provider's site, through an auto-payment agreement in which all charges of less than an agreed upon amount are automatically accepted, or by specifically accepting and agreeing to pay an indicated charge for accessing the requested content. In accepting any such payment arrangement, the end-user's account with the service provider is debited for the appropriate charge and the content provider's account is credited for the end-user's access.

3 Claims, 10 Drawing Sheets

FIG. 6

METHOD AND APPARATUS FOR THE PAYMENT OF INTERNET CONTENT

TECHNICAL FIELD

This invention relates to a payment method for Internet-delivered content.

BACKGROUND OF THE INVENTION

Internet content has for the most part been offered free of cost to end-users, with revenue generated in many instances through the self-advertising that the content provider receives through a large numbers of "hits" on his site. Alternatively, revenue is generated through the advertising of third parties that is placed directly on the content provider's Web pages in banner ads or pop-up/under advertising. With advertising revenues falling and failing to support the content provider's ability to deliver content free-of-charge to end-users, many content providers have begun charging end-users directly for delivering content to them. Credit cards are the only popular online payment method currently being used, but are rarely used for transactions of $5 or less due to their high overhead. This creates a problem for many content providers whose product cost is too high to be supported by advertising, but too low to be charged to credit cards.

Use of subscriptions that enable an end-user unlimited access over a fixed term to a particular content provider's Web site is more cost effective for credit card payment methodologies where the credit-card charge exceeds $10. Various content providers such as The Wall Street Journal and Consumers Reports offer annual subscriptions for fixed rates. Advantageously, the use of subscriptions enables the end-user to have a fixed cost associated with accessing content from these content providers' Web sites and provides a relatively predictable source of revenue to the content provider. Disadvantageously, however, if an end-user subscribes to several subscription-based sites, his budget for accessing premium Internet content may be exhausted, making access to other sites of interest monetarily infeasible. As a result, many end-users may find the effectiveness and attractiveness of the Internet as the mechanism for providing access to information content severely diminished. A further disadvantage of subscription-based systems is that they are inconvenient in that they often require an end-user to log on and authenticate himself for each Web session.

Various systems have been introduced that have attempted to deal with simplifying end-user authentication and/or payment-for-content. For example, the Microsoft® .NET Passport system (see, e.g., http://www.passport.com) provides a mechanism for authenticating an end-user to many different sites which subscribe to the .NET Passport service. An end-user after registering his profile information with the .NET Passport system thereafter need only provide his email address and his single .NET Passport password in order to obtain access to a subscribing site. An end-user can also make purchases, or can download cost-associated Internet content, from subscribing sites without actively having to provide his credit card information. Rather, that information is provided in encrypted form to the subscribing site by the .NET Passport system from the information in that requesting end-user's stored profile. In order to interact with the NET Passport system, however, content providers must install special software at their sites. MoreMagic™ (see, e.g., http://www.moremagic.com) offers a content-payment solution for wireless data transactions. In order to participate in a MoreMagic pay-for-content program, a content provider must install a custom hardware component at each of its sites between each content Web server and its Internet connection. Similarly, an iPIN™ system (see, e.g., http://www.ipin.com) provides for payment processing for service providers, content providers and portals. As with .NET Passport, consumers create an iPIN account and a subscribing content provider is provided with custom software that is installed on its content Web sites. Through this software, consumers enter their iPIN identity on the content provider's site, and the software authenticates them and authorizes payments. Payment detail records are stored by iPIN. iPIN accounts can be linked to a number of different kinds of financial institutions, including banks, credit card companies, or network service providers. In the latter case, iPIN charges are billed through the billing system of the service provider, which acts merely as a bill collector.

Disadvantageously, these prior art systems require the content provider to install special-purpose hardware and/or software. Since several different payment systems may coexist and each requires special-purpose software or hardware, content providers may be unwilling or unable to install all of the necessary systems, or there may be incompatibilities among them. A payment system for Internet content that requires no special-purpose hardware/software for the content provider is therefore needed.

A payment system that requires no special-purpose hardware/software for the end user is also needed since requiring end-users to acquire or install such special-purpose hardware or software will likely be a barrier for acceptance of such a payment system.

Further, acceptance of a payment system also requires that the end-user's browsing experience proceed, for the most part, uninterrupted since requiring the end-user to explicitly authorize each individual transaction, particularly for frequent, low-cost transactions or for transactions in which there is a time dependency, will make the browsing experience frustrating.

A payment system, if it is to be widely adopted, must also be capable of being gradually introduced to allow the smooth transition to new payment technologies. Whereas today the vast majority of Internet sites do not charge for content and only a small number do, this situation may be reversed in the future as many sites that offer proprietary content begin to charge for that content. As this transition takes place there will be a mix of free sites and sites for which information content must be paid. Further, there are likely to always be some sites that will remain free. Moreover, each site for which payment for content access is required will likely have a mix of customers: some that use traditional subscriptions, and some that pay on a page-by-page basis for what may be anywhere from less than $0.01 to what could be several dollars or more depending upon the value placed on that information by the content provider. Accordingly, a payment system must be capable of handling transactions with all types of sites and all types of payment options for a wide range of transaction costs.

An additional requirement that a payment system must have in order to be accepted by both end-users and content providers is that security be ensured for both. Specifically, end-users must be assured that their accounts cannot be subject to unauthorized charges; content providers must be assured that they will receive the funds associated with each transaction; and end-users and content providers must both be assured that their transactions are private.

SUMMARY OF THE INVENTION

The payment system and architecture of the present invention eliminates the problems associated with the prior art and satisfies the requirements needed for acceptance by both content providers and end-users.

In accordance with the payment system and architecture of the present invention, all payment related functions are performed within the end-user's Internet service provider network, and no changes are required outside of that network. Within the Internet service provider's network domain, when an end-user makes a request for a URL, a determination is made whether the requested URL is one for which payment is required and that the content provider has arranged with the service provider to support payment. That determination is effected by comparing the requested URL with a set of rules that are supplied by all the content providers for which the service provider supports payment. If no match is found, then the request is forwarded to the content provider. If a match between the requested URL and a rule is found, then the end-user is identified (such as through his client's IP address) and a payment policy associated with the matched rule is applied for access to the content referenced by the URL. If the end-user fulfills the requirements of this payment policy, access is granted to that content. The end-user's account with his service provider is then debited for that access either in accordance with what might be an established billing mechanism or through implicit or explicit acceptance by the end-user for the specific charge associated with accessing the content referenced by the requested URL.

More specifically, an access controller within the Internet service provider's network domain terminates an HTTP request issued by one of its end-user customer's client terminals. Based on the URL included within the terminated request, the access controller determines whether the requested URL is associated with a pay-for-content site for which the service provider supports payment. In order to determine how the request will be handled, the requested URL is matched against a database of rules that have been provided by and are associated with the content provider sites for which the service provider supports payment. Various novel mechanisms can be used to match a URL against a potentially large database of rules, which are defined in the described embodiment as regular expressions. In the described embodiment, a request is determined to be associated with one of the large number of regular expression rules by using a novel URL classification scheme that minimizes the number of costly regular expression comparisons that must be performed in order to determine whether a requested URL matches a rule. In accordance with this URL classification scheme, each regular expression rule is decomposed into n component parts (n being one or greater), and each component is mapped into a line segment on a numerical scale. In determining whether any of the rules apply to the URL associated with a request, the requested URL is mapped to a point in the n-dimensional space. If the point falls outside a rule's hyper-rectangle formed by that rule's n line segments, then that rule does not apply to the URL. If the point falls within the hyper-rectangle, then the rule might apply and an actual comparison is made between the URL and that rule's regular expression. Thus, many fewer regular expression comparisons need be performed. Further improvements in classifying URLs can be achieved by sorting the rules according to the domain name associated with the rule. Given a URL associated with a request, the domain part of that URL is extracted and used as the key for rules matching that domain within the rule set.

If no rule is determined to be associated with the requested URL, then the request is forwarded to the content provider. If a match is determined between the requested URL and a rule supplied by the content provider associated with that URL, then the end-user is identified based on, for example, the source IP address of the request. The request is then forwarded to a payment authority within the service provider's domain where a payment policy associated with the matched rule is applied before access to the content referenced by the URL is granted. Firstly, the payment authority checks whether that end-user has already paid to retrieve the content referenced by that URL and whether that payment is still valid to retrieve that content again. If the end-user has not already paid for retrieving that content or there is not a valid payment still in effect for that content, the payment authority determines whether that end-user has an already established payment mechanism to retrieve the content referenced by that URL. For example, the payment authority determines whether the end-user has a valid subscription to retrieve information content referenced by that URL. If the end-user is determined to have a valid subscription, he is granted access to the content referenced by that URL. If the end-user does not have a valid subscription, the payment authority determines what the charge for accessing the information content is and whether the end-user has established an automatic payment agreement in which the end-user has agreed to automatically accept and pay for charges that are less than or equal to a predefined maximum. If the end-user has an automatic payment agreement in effect and the charge to access the content referenced by the requested URL is determined to be less than or equal to that predefined maximum, then access to the content is granted and the end-user's account is debited for the charge and the content provider's account is credited for the access by the end-user to the content referenced by the requested URL. If an automatic payment agreement is not in place, or if the charge for the requested URL is greater than the predefined maximum, then authorization is required from the end-user before access to the information content of the requested URL is granted. For example, a window can be generated in the end-user's browser indicating the cost associated with the accessing that content and which requests input from the end-user to accept the charge, agreement to accept a different payment scheme such as a subscription, or rejection of the charge. If the end-user agrees to accept the individual charge or agrees to accept an alternative payment scheme, authorization to access the content referenced by the requested URL is granted. The end-user's account and the content provider's account are then appropriately debited and credited, respectively.

Advantageously, by incorporating the payment system within the Internet service provider's network, the end-user requires no separate authentication since the service provider is able to identify the customers attached to its network. Having established a financial arrangement with each of its end-user customers, the service provider knows the end-user will be responsible for and will pay for all charges made to his account. Further, where necessary, the service provider knows from what type of client device the request is coming. Thus, for example, if the request issues from a mobile device, the service provider knows how to interact with that mobile device in a format that is appropriate for that type of device.

Further advantages are: from the end-user's standpoint, the service-provider-implemented payment architecture provides a single and simple interface to all Internet subscriptions; from the content provider's standpoint, all issues of collecting payment information and maintaining per customer records are centralized at the service provider that the content provider can rely upon to properly collect and deliver the money due it; and from the service provider's standpoint, the service provider is able to maintain control of its end-user customers and has the benefit of charging the content provider for the service it provides.

BRIEF DESCRIPTION OF THE DRAWING

FIG. 6 shows screen shots of a user-interface through which an end-user can manage his subscriptions to content providers that charge for access;

DETAILED DESCRIPTION

Figure 1:
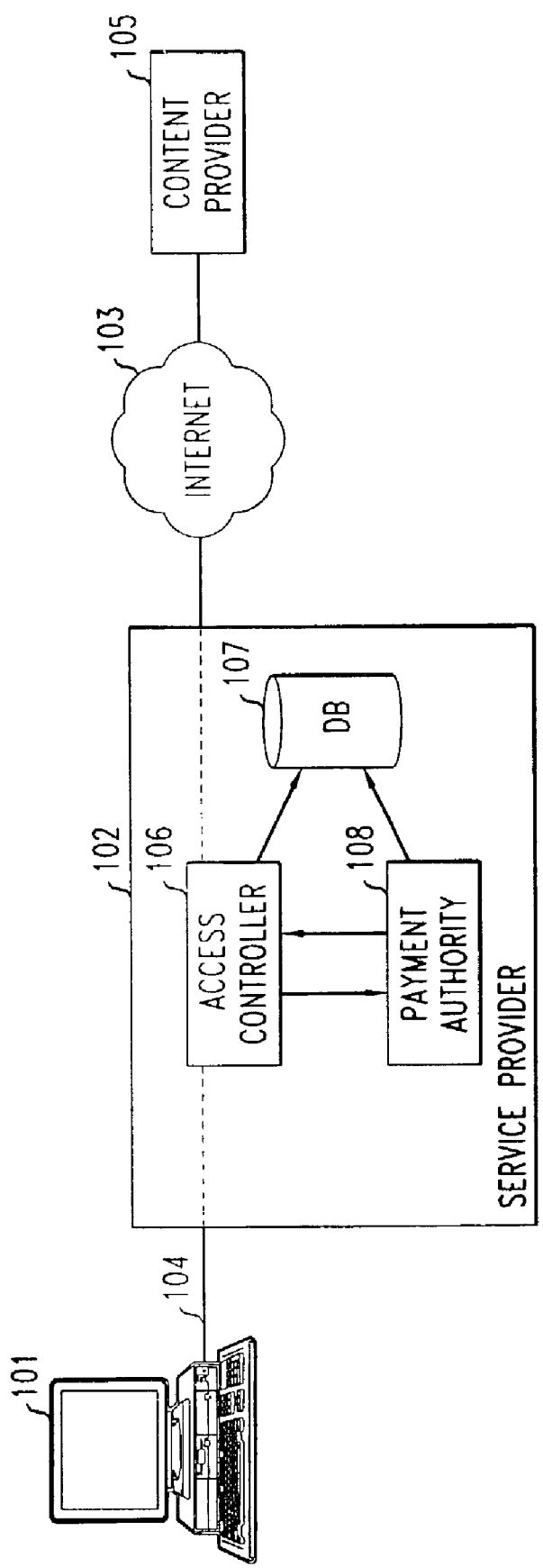
FIG. 1 is a block diagram of the architecture of the Internet service-provider-implemented payment system.

With reference to FIG. 1, a client desktop terminal 101 is shown connected through its end-user's selected Internet service provider network 102 to the Internet 103. As shown in FIG. 1, the client 101 is shown connected to the service provider's domain 102 over a connection 104. This connection could be a POTS (plain old telephone service) wired connection through the end-users local phone service (not shown) using a standard modem, a high-speed DSL wired connection to the end-user's local telephone end-office, or a wired connection using a cable modem to the end-user's local cable network. Although shown as a wired connection to a desktop computer terminal, the connection 104 could be wireless with the client 101 being any type of wireless terminal such as a PDA or a Web-enabled wireless telephone using a WAP or WML wireless protocol or other wireless protocol.

When the client 101 issues an HTTP request for a URL, service provider 102 rather than just passing that request on to its intended destination (content provider 105, for example), terminates that request, thereby establishing a connection between client 101 and service provider 102. The connection is terminated by an access controller 106, which is located within the service provider's network domain 102. Having terminated the HTTP request, access controller 106 identifies the requested URL from the HTTP header and possibly any cookies included within the request.

Access controller 106, after determining what the requested URL is, determines whether the information content referenced by that URL is premium content for which a charge is associated. Specifically, the URL is compared with a set of classification rules, which are stored in a database 107. In the described embodiment, these classification rules are expressed as regular expressions, and are provided by the content provider to the service provider when the content provider decides to participate in the service provider's payment program. These rules, often derived from existing content provider sites without needing to make changes to the content or structure of the site itself, provide a way of recognizing which of the content provider's URLs are associated with premium content. If the URL matches a classification rule stored in database 107, then the request is redirected to a payment authority 108 within the service provider's domain to determine how, in accordance with the matched rule, access to the content referenced by that URL is to be charged and handled. The cost associated with accessing the content referenced by a requested URL can be stored in association with the rule or an identifier can be stored in association with the rule that is used by the payment authority to determine the cost of the content. If the URL does not match a classification rule, then either the content provider to which the request is directed does not participate in the service provider's payment program and has an alternate arrangement for charging for access, or access to that URL is free of charge. Access controller 106 only determines that the URL does not match one of its stored rules and forwards the request directly to the content provider to which the request was initially directed. A URL classification scheme for determining whether a requested URL matches a stored rule will be described in detail hereinafter.

If the URL matches a classification rule, then the identity of the client making the request is determined and the request is sent to the payment authority 108 either directly by the access controller 106 or via a browser redirect from the client terminal 101. Access controller 106 or payment authority 108 can identify the client making the request from either its statically assigned IP address or from the dynamic IP address assigned to the client using, for example the DHCP or RADIUS protocol, when the client logged on with the service provider. The identity of the client can be determined using one of various techniques that are known for associating network usage with particular users. One such technique is described in co-pending patent application Ser. No. 09/315,636 filed May 20, 1999.

Once the identity of the client/end-user is determined, a payment policy for accessing the content referenced by the URL is applied. The payment authority 108: (1) determines the pricing rules for that content; (2) retrieves the end-user's stored payment profile from database 107; (3) authorizes or rejects the request, obtaining authorization directly from the end-user if necessary; (4) if authorized, records a payment-detail record for the request; and (5) generates and forwards a certificate to access controller 106 to indicate that the end-user has paid for access to the URL, while redirecting the request back to the access controller for processing. If access is authorized, then the request is directed to the content provider's Web site 105. If access is not authorized by the absence of an existing payment plan or rejection by the end-user of the indicated charge, then access to the content provider's Web site 105 is denied and the end-user is so notified.

Figure 2:
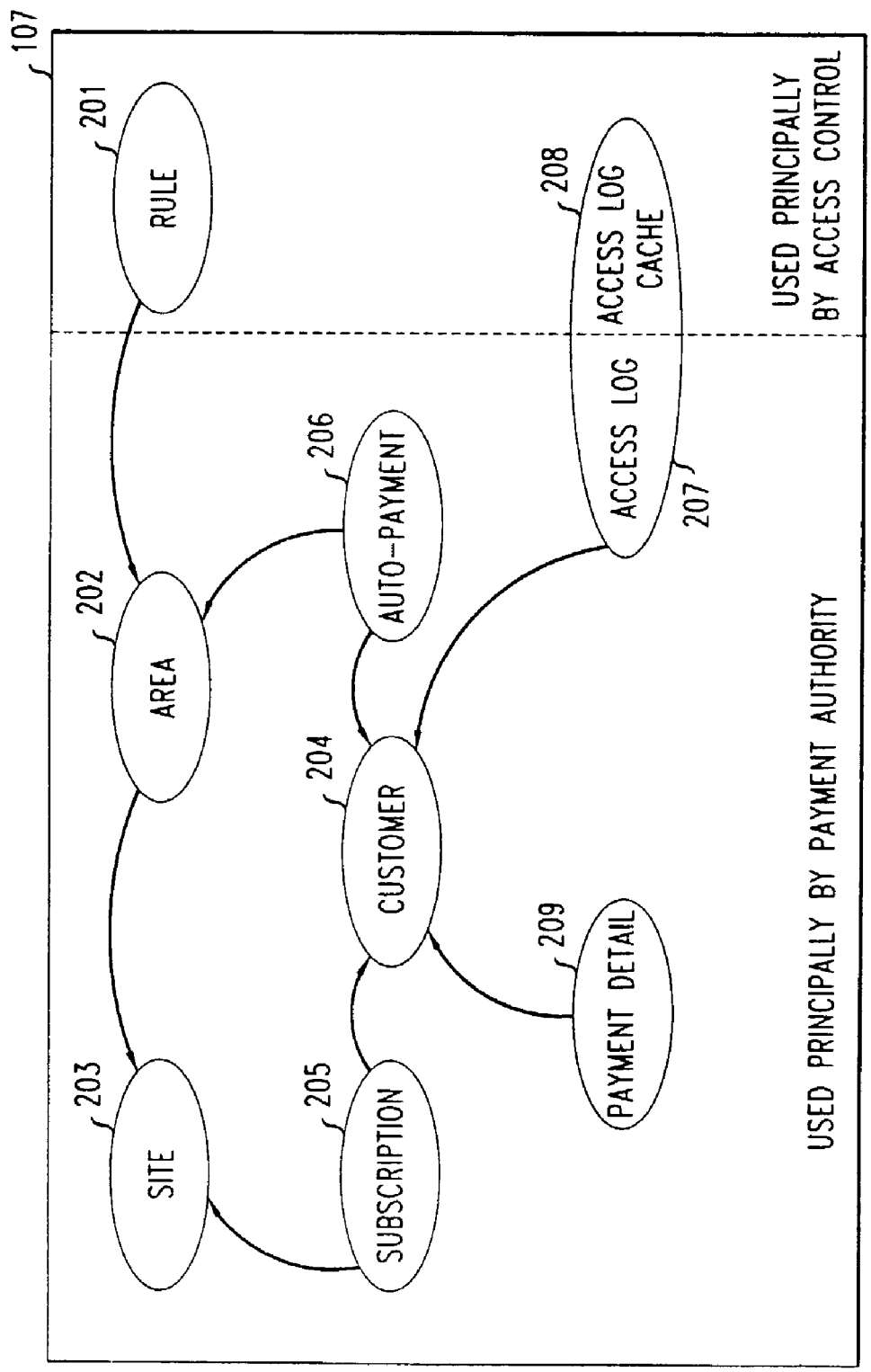
FIG. 2 is a block diagram showing the structure of a database used by the payment system of FIG. 1.

The structure of database 107 is shown in FIG. 2. Although shown as a single database, database 107 could in practice consist of multiple separate databases such as, for example, a separate database associated with the payment authority 108 and a separate database associated with the access controller 106. As shown in FIG. 2, database 107 includes plural objects, shown as ovals, with the references between objects shown as arrows. The rule object 201, used principally by access controller 106, is essentially a table where each entry includes the regular expression of a rule, the identity of the content provider's site that is associated with that rule, a cost associated with that rule, or an identifier that is used by the payment authority to determine the cost, and, optionally, an area within that site to which that that rule pertains. Thus, for example, the New York Times site may have certain rules that are associated with its Reuters news sections, and other rules that are associated with its Sunday Arts and Leisure section. For each such area, and used principally by the payment authority 108, is an area object 202 that includes for each area in each site a per-page charge for accessing a page in that area, and the duration of how long a particular end-user can access a page in that area once he has paid the charge. That could be, for example, forever, for a defined time period or a fixed number of times. Site object 203, referenced from the area object 202, includes the name of each content provider's site for which the service provider supports payment and, for example, a subscription fee that an end-user could pay for a subscription to that site. The customer object 204 includes for each end-user various customer details such as name, address, etc. For an end-user making a URL request, who is identified by either the access controller 106 or payment authority 108, the subscription object 205 determines from its tables whether that end-user has a subscription to the requested site. Such a subscription can provide unlimited access to an entire site for a given period of time. Auto-payment object 206 similarly determines from its table whether that end-user has an established automatic payment agreement which defines under what conditions the end-user doesn't want to be asked to authorize a charge explicitly, but will accept the charge automatically. Auto-payment agreements, as shown in FIG. 2 by the relationship between object auto-payment object 206 and area object 202, apply to an area within a site, but could apply to an entire site. They can also have a duration associated with them. The conditions associated with an auto-pay agreement specify details such as the maximum charge that should be automatically accepted, or the maximum total charges that should be automatically accepted. A condition attribute can also be used to specify that no charge should ever be accepted from a specific site so that the end-user will not even be asked whether he wants to accept a charge.

The access log object 207 records which resources each end-user has paid for either by explicitly authorizing a charge, or through an auto-payment agreement, keeping track of what certificates issued to the access controller by the payment authority for that end-user are still valid. This ensures that an end-user can re-access content for which access has already been paid, without having to pay again. The primary copy of the access log is maintained at the payment authority 108. The access controller 106 caches the information from the primary copy 207 in an access log cache 208. Thus, if an end-user accesses a page for which he has already paid and for which a certificate is still valid, access can be granted immediately without needing to obtain authorization by the payment authority. Entries in the cached access log 208 at the access controller are purged as they expire. Loss of the information in the cached access log will not result in the end-user's loss of access for which he had paid since the payment authority can re-generate a certificate if an existing payment method is still valid.

The payment detail object 209 maintains a log that records all payment related events including when an end-user agrees to pay for accessing the content referenced by a URL, the method by which they agreed to pay for that access (e.g., subscription, auto-payment, authorized payment), and all of an end-users subscription and auto-payment agreements.

Figure 5:
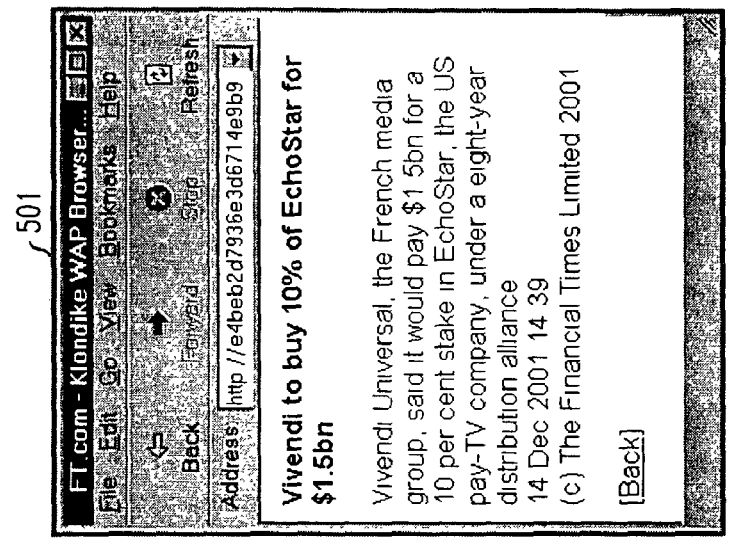
FIGS. 3-5 are screen shots of a browser running on a wireless device on which an end-user accesses content referenced by a URL for which a charge is associated.
Figure 4:
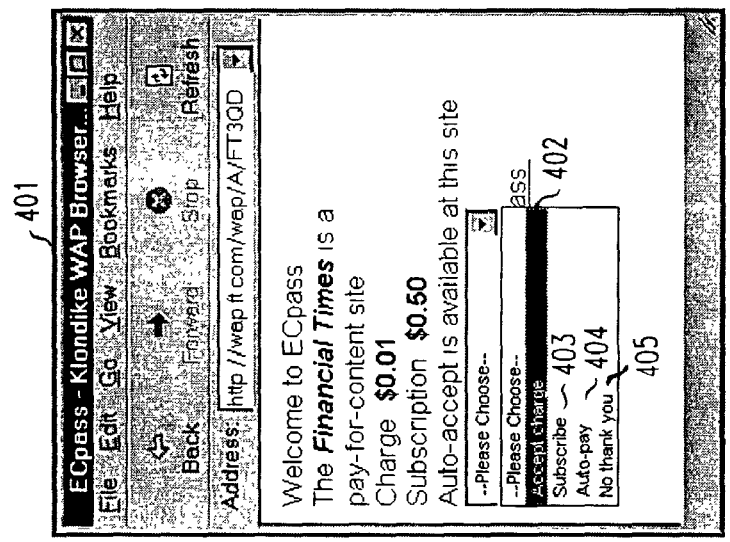
Figure 3:
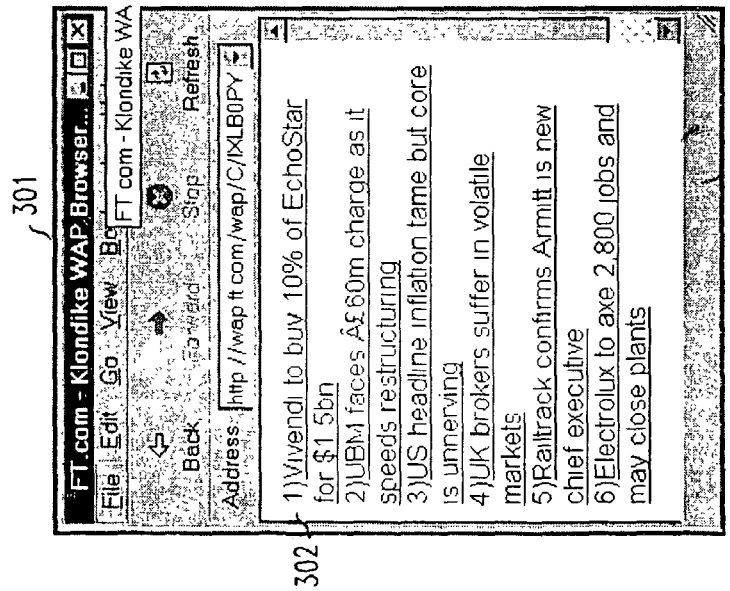

The end-users browsing experience is described in conjunction with an example shown in FIGS. 3-6. FIGS. 3-5 show screen shots of a wireless device using a WAP/WML browser for the Microsoft Windows environment developed by Apache Software Consulting, Inc. In the example, a WAP/WML site operated by The Financial Times in London is used as the content provider from which the end-user desires to obtain content. FIG. 3 shows a first screen shot 301 of telecommunication headlines provided by the Financial Times. It is assumed that the headlines are available for free, and that charges are associated with retrieving the articles themselves. For this example, it is assumed that this is the first time the end-user has visited the site. When the end-user selects the first headline 302, the access controller detects from the set of rules stored in access controller 106 that this is a pay-for-content URL, and redirects the request to the payment authority 108. To alert the end-user that there is a charge associated with this information content, the link could be annotated on the screen in some way to indicate that there is a fee. For example, the link might be color-coded, the price might be embedded within the text, or the cursor might change its shape while hovering over the link.

If the end-user selects that link, a page appears, as shown in the screen shot 401 in FIG. 4, explaining that this is a pay-for-content site, and providing pricing information. Four selections are available: "accept charge" 402, "subscribe" 403, "auto-pay" 404, and "no thank you" 405. If the end-user selects "accept charge", his account will be charged $0.01 for access to the selected page. If the end-user selects "subscribe", he will be offered a subscription to the London Financial Times for $0.50 for some defined and provided period of time for unlimited access. If the end-user selects "auto-pay", then he will be offered the ability to automatically accept all charges from this site that are less than or equal to a defined maximum amount without having to separately authorize each one. If the end-user selects "no thank you", he will not be linked to the requested site. Advantageously, if the user selects either "subscribe" or "auto-pay" and agrees to the terms provided, then, in the future, he will be taken directly from the first page 301 in FIG. 3 to the desired story shown in screen shot 501 of FIG. 5, bypassing the authorization page 401 of FIG. 4, thereby providing a smoother browsing experience that is not interrupted by the authorization page. The payment system, however, still participates in the transaction to record payment-detail records.

Figure 6:
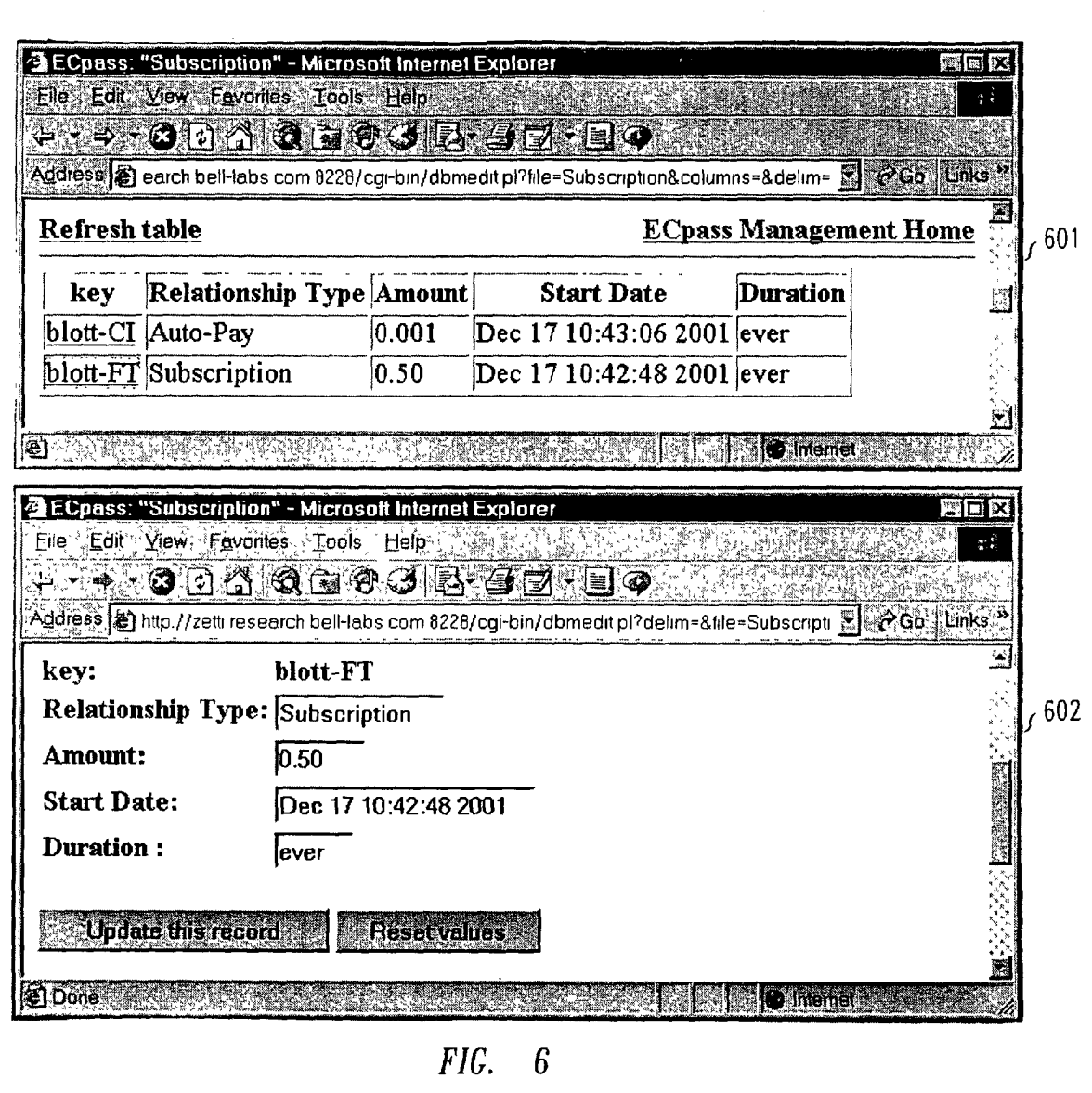

FIG. 6 shows screen shots 601 and 602 that enable end-users to view and change their current set of subscriptions and auto-pay agreements via a separate interface that is controlled by the service provider. Screen shot 601 is a summary of the end-user's subscriptions and auto-pay agreements. In this example, the user "blott" has a $0.50 subscription to the Financial Times (code "FT"), and an auto-pay agreement for up to $0.001 with Cosmic Infinity (code "CI"), a WAP gaming site. Screen shot 602 shows a subscription manager interface than enables the end-user to cancel, extend, or modify existing subscriptions in one place without having to visit each of the sites to which he has subscribed. This provides convenience to the user, especially in the case of managing wireless subscriptions from a desktop machine. Other pricing models, such as bucket-of-clicks pricing, could be integrated within the subscription manager based on specific service provider requirements.

Figure 7:
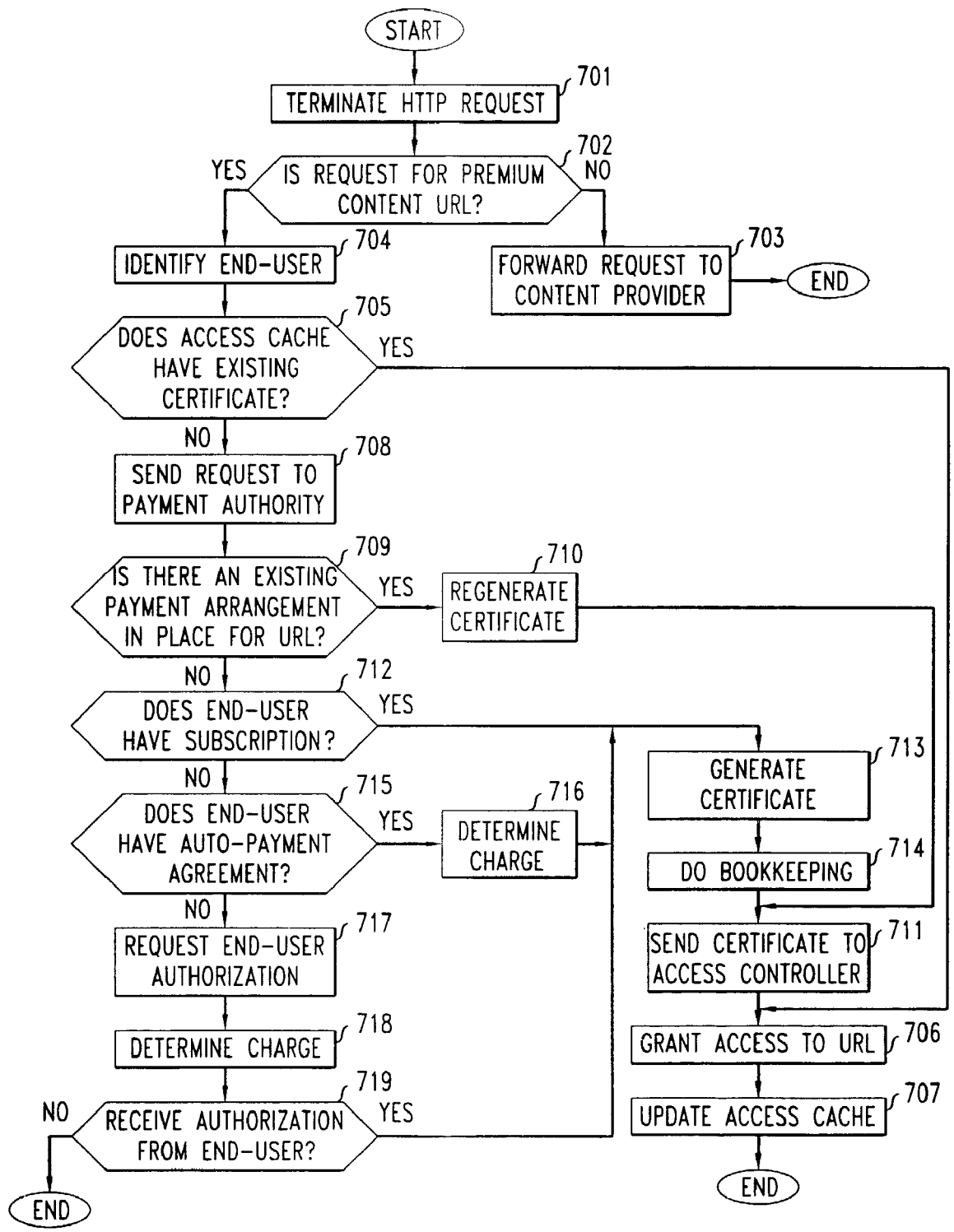
FIG. 7 is a flowchart that describes the steps associated with the payment process.

The flowchart in FIG. 7 summarizes the steps associated with the above-described service-provider-controlled payment system. At step 701, a request made by an end-user is terminated by the access controller 106. At step 702, a determination is made whether that request contains a URL that is associated with premium content. If not, then at step 703, the request is forwarded to the content provider without further involvement of the payment system. If the content referenced by the requested URL is determined to be premium content, then, at step 704, the end-user is identified. At step 705, a determination is made whether the access cache in the access controller has an existing certificate for that end-user for that URL. If yes, then, at step 706, access is granted immediately to the content referenced by that URL and, at step 707, the access cache is updated, if necessary.

If there is no existing certificate in the access cache, then, at step 708, the request is sent to the payment authority 108. At step 709, the payment authority makes a determination whether that end-user has an existing payment arrangement in-place for that URL. Such an existing payment arrangement could still be in place if it was granted to that end-user, for example, for one use that was never used, for an unlimited number of accesses over a predetermined time interval, for a predetermined number of accesses, or an unlimited number of accesses forever. If for some reason the access cache did not have that information available at step 705 to grant immediate access to the requested URL, that information would be determined at this step 709. If an existing payment arrangement is in place, then, at step 710, the certificate is regenerated by the payment authority and sent, at step 711, to the access controller. At step 706, access to the URL is granted, and, at step 707, the access cache is appropriately updated.

If, at step 709, it is determined that an existing payment arrangement is not in place for the requested URL, then, at step 712, a determination is made whether the end-user has a current subscription to access the information content referenced by that URL. If yes, then, at step 713, a certificate is generated and, at step 714, bookkeeping is performed to record the end-user's access to the content referenced by that URL. At step 711, a certificate is sent to the access controller, at step 706, access is granted to that content, and, at step 707, the access cache is updated. If, at step 712, the end-user is determined not to have a subscription, then, at step 715, the payment authority determines whether the end-user has an auto-payment agreement in place that covers the requested URL. If an auto-payment agreement is determined to be in place, then, at step 716, the charge associated with accessing the content referenced by the requested URL is determined. If it is within the maximum charge for which acceptance is automatically authorized by the auto-pay agreement, then, at step 713, a certificate is generated. At step 714, bookkeeping is performed, debiting the end-user's account for the charge and crediting the content provider for the access. At steps 711, 706 and 707, respectively, a certificate is sent to the access controller, access is granted to the URL, and the access cache is updated. If, at step 715, the end-user doesn't have an auto-payment agreement in place, then, at step 717, a request for end-user authorization is made for the charge that is determined at step 718. If, at step 719, authorization is not received from the end-user, then access is not granted. If, however, authorization is received, then, at steps 713, 714, 711, 706 and 707, respectively, a certificate is generated, bookkeeping is performed, the certificate is sent to the access controller, access to the requested content referenced by the URL is granted, and the access cache is updated.

Figure 8:
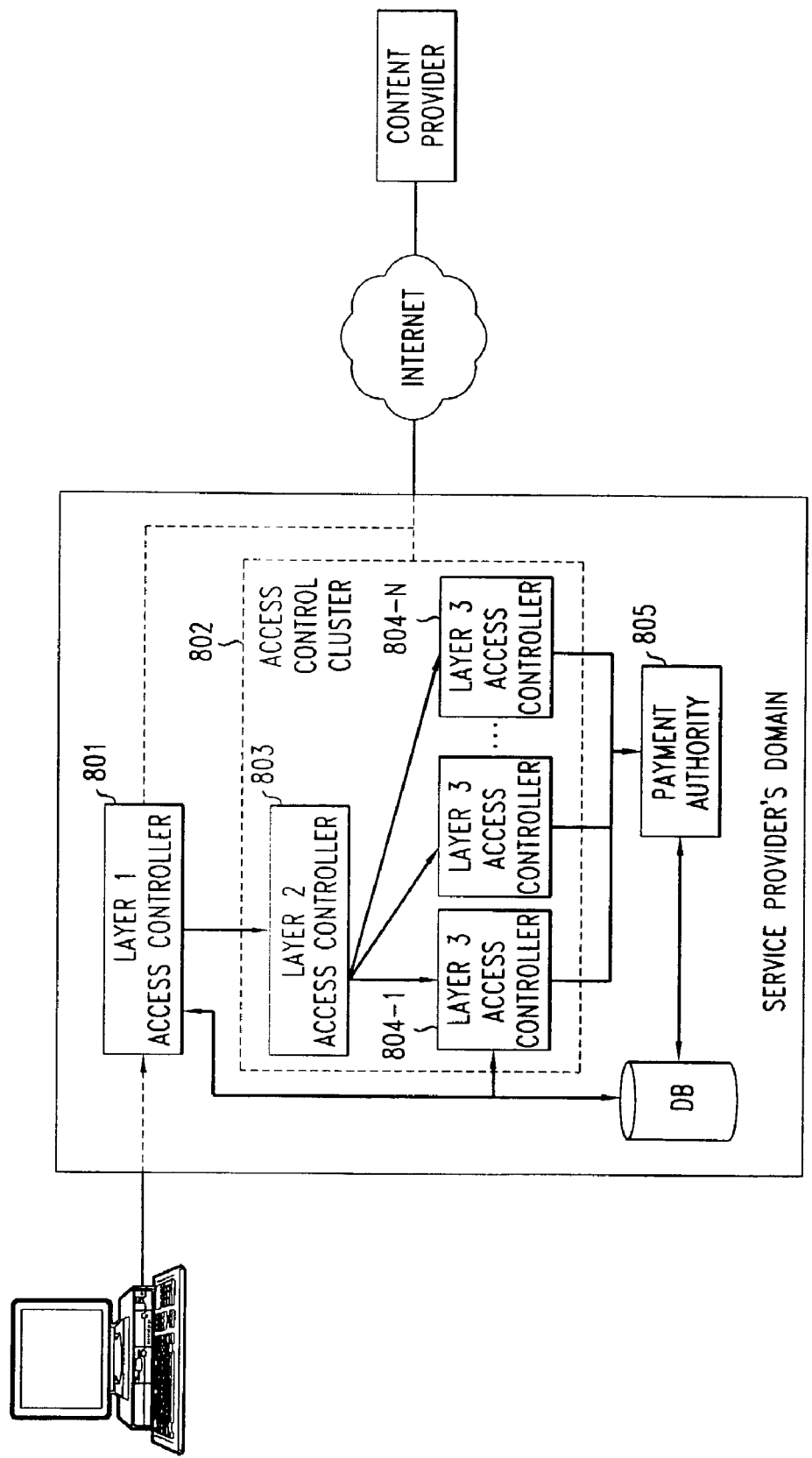
FIG. 8 is a block diagram of the hardware architecture of the payment system that is used for larger service providers.

The payment system can be deployed in a variety of hardware architectures, from simple to advanced, depending upon the scale of the network in which it is embedded. In the relatively straightforward deployment system in FIG. 1, the access controller 106 operates as an HTTP proxy, which may either be explicit or transparent. A separate access controller would be deployed at each point of presence of the service provider. The various access controllers could share a single back-end payment authority 108. The more extensive hardware architecture in FIG. 8 could be employed for larger service providers. In this architecture the functions of the access controller are split into several components. Layer 1 access controller 801 is a layer 4/7 switch, which redirects HTTP requests to an access control cluster 802 for processing. Layer 1 access controller 801 may also perform some preliminary filtering of requests. Layer 2 access controller 803, also a layer 4/7 switch, performs load balancing across a plurality of layer 3 access controllers 804-1-804-N, which are HTTP proxies. Traffic from several points of presence may be directed to a single access control cluster, and traffic from several access control clusters may be directed to a single payment authority 805.

As previously described, a function of the access controller is to determine whether any of the many rules supplied to it by content providers that subscribe to the service provider's payment system apply to a URL associated with an incoming request. Each incoming URL is classified against this database of rules to determine whether the request should be forwarded to the content provider directly (in the case of free content), or to the payment authority (in the case of premium content). This process is referred to as URL classification.

As noted above, in this embodiment the rules are expressed as regular expressions. It is not necessary, however, that the rules be expressed as regular expressions and they can be expressed in other ways. A request is considered to be for premium content if the URL matches any of the rules. For the described embodiment in which the rules are expressed as regular expressions, an example of a regular expression (RE) associated with a hypothetical rule for articles on the Financial Times WAP site might be:

http://wap.ft.com/wap/A/.* where the final "." is a wild-card denoting any character, and "*" indicates zero or more occurrences of characters matching that wild-card. Thus, the rule above matches any URL with the prefix "http://wap.ft.com/wap/AP". For example:

http://wap.ft.com/wap/A/FT3W5S4J5VC/
FTDWK4QAIPC.

There may be hundreds of thousands of classification rules, and thus hundreds of thousands of REs. Since regular expression operations are expensive, comparing each request with each RE sequentially would be prohibitively slow. Accordingly, the payment system needs a more efficient approach to URL classification. Before describing the more efficient approach to URL classification used by the payment system, it is noted that URL classification is in fact a special case of a more general problem: that of matching an arbitrary string against a database of regular expressions (or REs). This more general problem is referred to as RE classification. The method for URL classification described below is based upon a solution to this more general problem.

In describing the solution to the more general problem, what is assumed is some alphabet T, regular expressions over T, and special characters $\alpha$ and $\zeta$. The lexicographic ordering over T is extended to include $\alpha$ and $\zeta$ such that $\alpha$ ranks before all other characters in T, and $\zeta$ ranks after all other characters in T. The method is based upon the idea of extracting lexicographical bounds on the strings that could possibly match a regular expression. For example, consider the regular expression E to be bd*f. The string "bdc" is a lower bound on the strings that might possibly match E. No string lexicographically preceding "bdc" can ever match E. Similarly, "bf" is an upper bound on the strings that might possibly match E. No string lexicographically following "bf" can ever match E.

Lower and upper bounds are obtained as follows. Given a regular expression, the deterministic finite state automaton (DFSA) associate with that regular expression is first constructed. This is a technique well known to those in the computing science art. To obtain the lower bound, one begins at the start state, and traces a path through the automaton by, at each state, selecting the next state to visit by following the transition corresponding to the alphabetically lowest transition leaving that state. The lower bound is the sequence of characters on the transitions traversed. The process is stopped when either a terminal state is reached, or a state is reached that has been visited previously. In the latter case, appended to the lower bound is the character alphabetically preceding that of the alphabetically lowest character with a transition state leaving that state (or α, in the case of the alphabetically first character). For example, if the state has transitions for 'd', 't' and 'y', then 'c' is appended to the lower bound, since 'c' precedes 'd'.

The upper bound is obtained similarly. A path is traced through the automaton by, at each state, selecting the next state to visit by following the transition corresponding to the alphabetically highest transition leaving that state. The upper bound is the sequence of characters on the transitions traversed. The process is stopped when either a terminal state is reached, or a state is reached that has been visited previously. In the latter case, appended to the upper bound is the character alphabetically following that of the alphabetically highest character with a transition state leaving that state (or ζ, in the case of the alphabetically last character). For example, if the state has transitions for 'd', 't' and 'y', then 'z' is appended to the lower bound, since 'z' follows 'y'.

The special cases in which an additional character is appended to the bound occur whenever the true bound would be of infinite length. The character preceding or following the character on the transition is used to break such infinite bounds. The special characters α and ζ are needed to break infinite strings containing the first and last characters of the alphabet, respectively.

The lower and upper bounds provide a fast filter in the string domain. If a string lexicographically precedes the lower bound, or follows the upper bound, then that string cannot match the corresponding regular expression. This, in effect is a filter operation. However, the filter can be made even more efficient by mapping it into the numeric domain. Doing so creates a filter that has constant size, is more compact (thereby improving memory locality), and uses integer operations that execute as single instructions in place of string operations that execute as multiple instructions.

In practice, strings of interest are drawn from some domain with some distribution. For instance, the strings might be Internet host names, in which case certain names (such as "cnn.com") occur more frequently than others. Given a sample of strings from the domain of interest, that sample can be used to generate a mapping from the string domain to the numeric domain by sorting the sample, and assigning each string a numeric code based upon the position in the sample into which it would be inserted, were it to be inserted.

Figure 9:
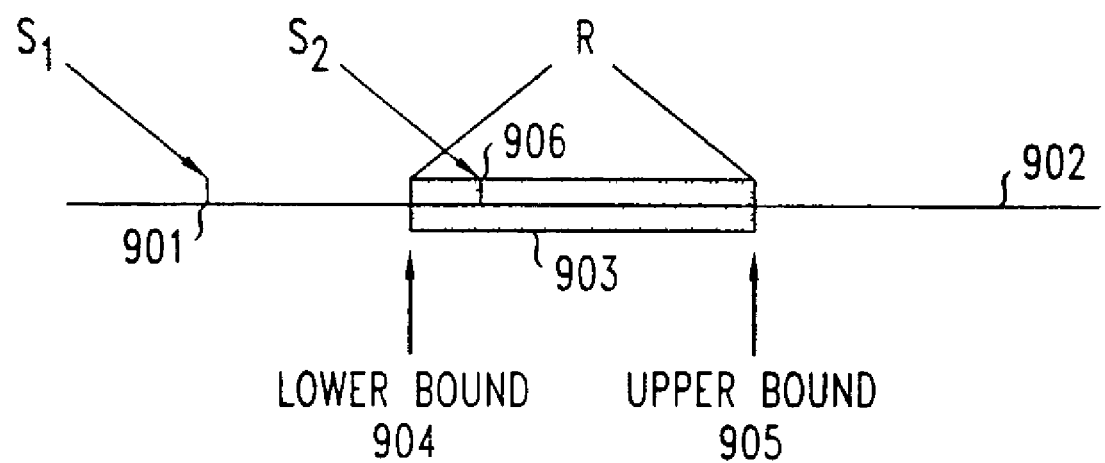
FIG. 9 shows the mapping of a URL to a point in the numeric domain and its comparison to a region corresponding to a regular expression rule.

Thus, a regular expression can be mapped to a line segment (within a one dimensional spatial domain), based upon the lower and upper bounds in the numeric domain. It should be noticed that this mapping preserves the lexicographic ordering. Therefore, by mapping a query string to a point in the numeric domain, a fast filter in the numeric domain is obtained. If the point precedes the lower bound in the numeric domain, then the string cannot possibly match the corresponding regular expression. Moreover, if the point follows the upper bound in the numeric domain, then again the string cannot possibly match the corresponding regular expression. However, if the point falls within the line segment corresponding to the regular expression, then the string may match the regular expression, and the string must be compared against the regular expression itself to determine whether there is in fact a match. This is illustrated in FIG. 9 where the mapping of string S1 to point 901 on the linear numeric axis 902 does not match the regular expression R, which is mapped into the region 903 between lower bound 904 and upper bound 905. String S2, which is mapped to the point 906, however, might match R since it falls within the region 903 between points 904 and 905. The advantage of this method is that the numeric operations can be up to 2 orders of magnitude cheaper than the corresponding regular-expression operations.

Having described a method of comparing one string against one regular expression above, the more pertinent issue of comparing a query string against a database of regular expressions is addressed below.

Figure 10:
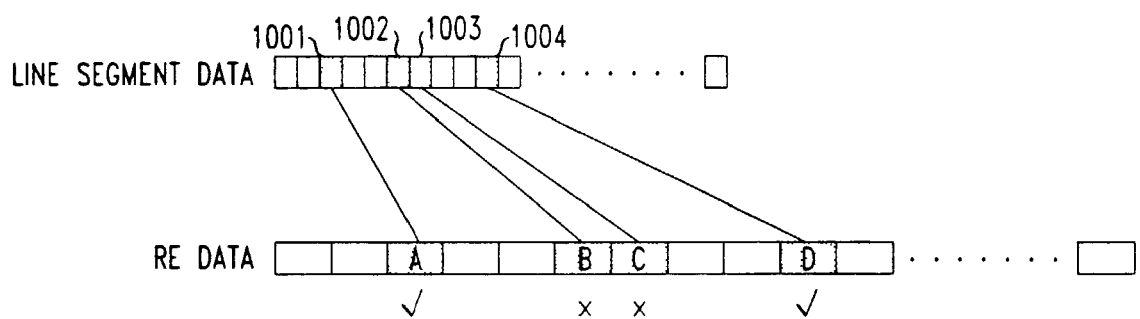
FIG. 10 shows the matching or not of line segment data with regular expression data.

The simplest data organization for main-memory search, referred to as the SCAN method, is the following. The SCAN method uses two sequential data structures: one an arbitrarily ordered array of the line-segment data, and the other a correspondingly ordered array of the REs. The SCAN search method scans the line-segment data sequentially checking the point corresponding to the query string for containment within each line segment in turn. Whenever there is a match against the line segment, the query string is compared to the RE itself. This situation is illustrated in FIG. 10. In the example shown in FIG. 10, four line segments 1001, 1002, 1003 and 1004, match the query string, and the query string is compared against the RE corresponding to each of those four line segments. Only two of these candidate REs, A and D, actually generate a match. Candidates, B and C are false positives. Given a data set consisting of line segments, queries returning the set of line segments containing a given point are known as stabbing queries. Several methods have been proposed to support stabbing queries including Bentley's segment tree (see, e.g., Yi-Jen Chiang and Roberto Tamassia, Dynamic algorithms in computational geometry, *Proceedings of the IEEE*, Special Issue on Computational Geometry, 80(9):1412-1434, 1992) and McCreight's priority search tree (see, e.g., E. M. McCreight, Priority search trees. *SIAM Journal of Computing*, 14:257-276, 1985). These methods are generally of complexity $O(\log(n)+k)$. However, the simpler linear-scan approach described above generally performs well in practice.

The discussion above applies to the case of classifying an arbitrary query string against a database of regular expressions. Turning now to the more specific case of classifying a URL against a database of regular expressions over URLs, one can observe that URLs are not unstructured. Rather, they conform to a well-defined format:

scheme://host:port/path#fragment?query

Going further, the host can be decomposed into a hostname part and a domainname part:

scheme://hostname.domainname:port/
   path#fragment?query

Thus, each URL can be considered to be a 7-tuple consisting of a scheme, hostname, domainname, port, path, fragment and query. A similar simple structure is present in many other types of data including e-mail addresses, telephone numbers, addresses, and some simple XML documents.

In the general case, assume that it is possible to decompose a string of interest into n parts in this way. In this case, the classification rules can be expressed as n-tuples of (independent) regular expressions:

(R1, R2, . . . , Rn)

Continuing the URL example above, R1 would match the scheme part, R2 the hostname part, R3 the domainname part, etc.

Given n REs, the line segment filter technique described above can be applied independently to each RE to generate n independent line segments (seven, in the case of URLs). Considered together, those line segments form an n-dimensional hyper-rectangle in the spatial domain. Similarly, each query string (or URL) is broken into component parts corresponding to the n (or 7) regular expressions of the rule. Each resulting string is then mapped to a point in a numeric space using the sample-based method described previously. The result is n 1-dimensional points, and, considering these together, a point in n-dimensional space is obtained (or, for the case of URLs, a point in 7-dimensional space). If the point falls within the hyper-rectangle, then the query string might match all of the corresponding REs, and the query string must be compared with the corresponding REs to determine whether there is in fact a match. However, if the point falls outside of the hyper-rectangle, then the query string does not match the corresponding REs, and can be eliminated from the search.

This approach works well in the case of URL classification for two reasons. First, by decomposing URL rules in this way, more information is available to reduce the search space. In particular, there is more opportunity to obtain a tighter line-segment bound with higher selectivity. Second, with the addition of further dimensions, there are more opportunities for the filter to eliminate candidates from the search. With one dimension, there is just one opportunity to eliminate each candidate from the search space. However, with two dimensions there are two opportunities, and with four, four opportunities, etc.

Above, a linear scan was proposed to search a database of arbitrary regular expressions. However, in the case of URLs, it is possible to do substantially better than scanning all of the hyper-rectangles. In particular, frequently, the domainname part of a URL classification rule will match just a single domain. For instance, the domainname part of the rule above is "ft.com", which only matches sites that are owned and operated by the Financial Times. In general, identifying the domainname part within a URL rule is context sensitive. For instance, within the ".com" region, the domain part consists of the last two parts of the host name, whereas within the ".uk" region, the domain part consists of the last three parts of the host name (e.g. "bbc.co.uk" for "news.bbc.co.uk"). If the domainname part cannot be determined uniquely for a rule, for example, if the domain part contains a wild-card, then the rule is considered to be multi-domained.

Figure 11:
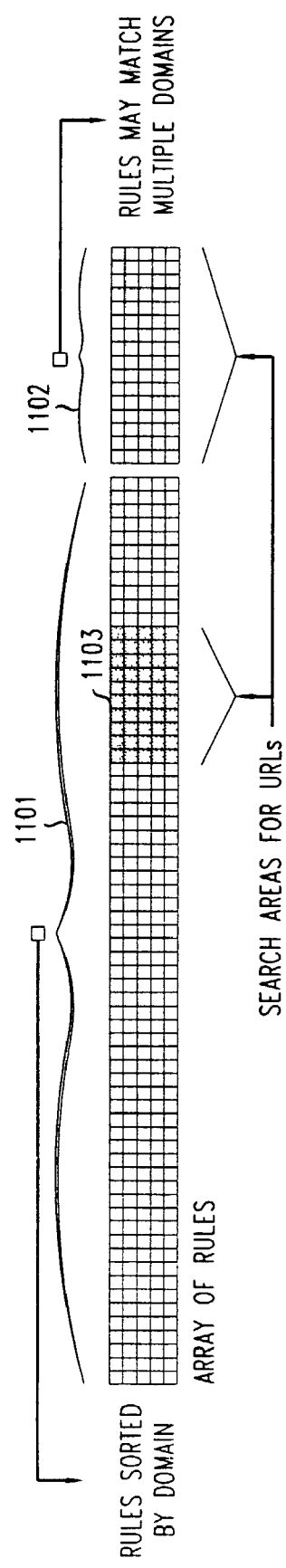
FIG. 11 shows the organization of an array of rules in accordance with domain name.

The classification rules are stored in a large array or file. Moreover, that array or file is sorted by the domain name associated with the rule, with multi-domained rules sorted after all others. The search procedure is now simplified. Given a URL, the domain part of that URL is extracted, and used as the key to search for the rules matching that domain within the rule set (for example using a binary search). The search compares the URL with each rule in the group matching the domain part, as well as with each rule in the multi-domain group. This is illustrated in FIG. 11. In FIG. 11, each column represents a different rule and each box within a column represents the different dimensions of the rule. One of those dimensions is the domain name and the rules are sorted on that dimension. As noted in FIG. 11, one group of rules 1101 are sorted by domain and a second group of rules 1102 are those rules that may match multiple domains, the multi-domain rules. When a request is received, all of the rules do not need to be compared with the URL associated with the request. The shaded area 1103 in the array of rules represents a subset of the rules sorted by domain that matches the domain name of a URL in an exemplary end-user request. Thus, a determination only needs to be made whether the numerically-mapped requested URL falls within the hyper-rectangle associated with one or more of these rules in this subset. In addition, a determination needs to be made whether the numerically-mapped requested URL falls within the hyper-rectangle associated with any of the multi-domain rules 1102. This approach successfully prunes the search space whenever there are not too many rules in the multi-domain group, or within each individual domain. However, even if the search space is not substantially pruned, the overhead is only logarithmic in the size of the rule set. Moreover, in the case that the rules are disk resident, the disk operations are sequential, and thereby the method retains the benefits of sequential I/O.

Although the URL classification scheme described above is used to determine whether a requested URL contains premium content for which a charge is associated, it can be used in other applications. For example, URL classification can be used for purposes of content filtering, where access to a URL is granted or denied based on a set of regular expression rules with which the requested URL is compared. This could be used to determine whether the content referenced by a URL is appropriate for a young viewer. Other applications of the URL classification scheme include content routing, where the destination of a request is selected based upon the requested URL.

Figure 12:
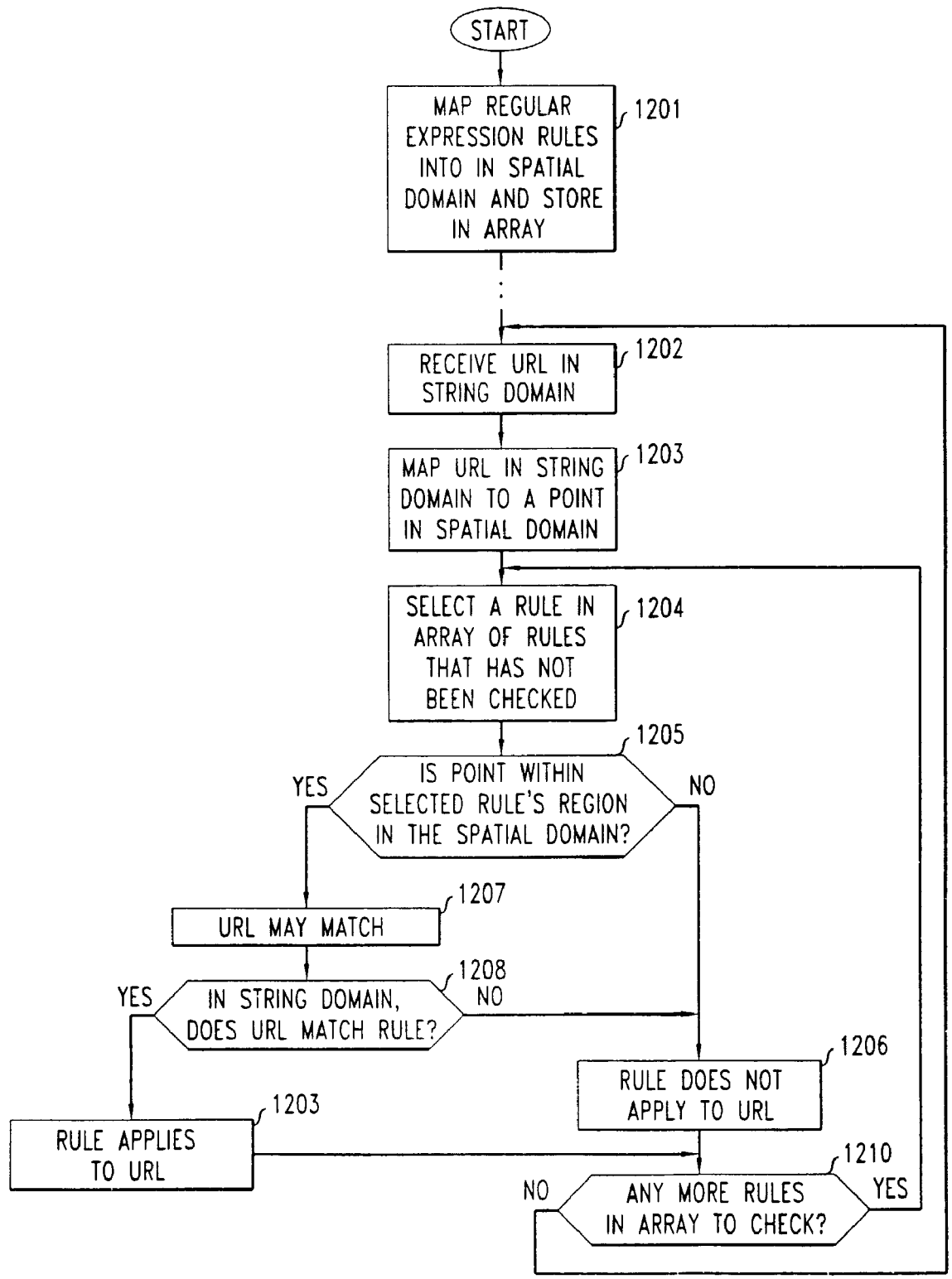
FIG. 12 is a flowchart that illustrates a multidimensional method for URL classification.

The flowchart in FIG. 12 summarizes the method of URL classification. At step 1201, each of the regular expression rules in the string domain are mapped to regions in the spatial domain (single or multi-dimensional) using upper and lower bounds that are determined for each regular expression. The rules are then stored in an array. At step 1202, a URL is received for which a determination is needed whether any of the rules apply. At step 1203, the URL in the string domain is mapped to a point in the spatial domain. At step 1204, a rule is selected from the array to determine whether it applies to the URL. At step 1205, a determination is made whether the point associated with the URL in the spatial domain is within the selected rule's mapped region in the spatial domain. If it is not, at step 1206, the rule is determined not to apply. If it is, then, at step 1207, the rule may apply to the URL. At step 1208, a determination is then made in the string domain whether the URL matches the rule. If it doesn't, at step 1206, the rule is determined not to apply. If it does, at step 1209, the rule is determined to apply to the URL. At step 1210, a determination is made whether there are any more rules in the array of rules that have not yet been compared with the URL. If there are, then the flow returns to step 1204 to select another rule with which the URL has not yet been compared. If not, then all the rules that apply to the URL have been determined and the flow returns to step 1202 to await the input of the next URL for which an applicable rule, if any, needs to be determined.

As previously described, the rules can be searched according to domain name to reduce the number of comparisons that need to be made.

Although described in connection with URL classification, the above-described procedure could be used for classifying any string of interest such as email addresses, HTTP headers, or simple XML documents) against a set of regular expression rules. Further, as previously noted, the region in which each regular expression rule is mapped can be an n-dimensional hyper rectangle. Each of the n dimensions of the hyper-rectangle corresponds to one of the n decomposed parts of a regular expression, the query string (URL or other) being similarly decomposed into corresponding n parts.

The foregoing merely illustrates the principles of the invention. It will thus be appreciated that those skilled in the art will be able to devise various arrangements, which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be further appreciated by those skilled in the art that the block diagrams herein represent conceptual views embodying the principles of the invention. Similarly, it will be appreciated that the flowchart represents various processes that may be substantially represented in computer readable medium and so executed by a computer or processor, whether or not such computer or processor is explicitly shown.

The invention claimed is:

1. A method for providing access to a plurality of fee-based Internet content providers, comprising:
   receiving, at an Internet service provider network, a request for a uniform resource locator (URL) corresponding to an address of a content-provider served via the Internet service provider network;
   determining, by a controller in the Internet service provider network, that the URL matches at least one content-provider payment rule maintained by the Internet service provider network;
   identifying, by the controller in the Internet service provider network, a user associated with the request;
   wherein determining includes:
      mapping the URL to a point in a spatial domain;
      after determining that the point is within an upper bound limit and a lower bound limit associated with one or more content-provider payment rules, comparing the URL with at least one of the one or more content-provider payment rules; and
   forwarding the request to a payment authority operated within the Internet service provider network for evaluation of payment status;
   determining, by the payment authority, a prior authorization for payment for a content has been made by the user; and
   after determining the prior authorization for payment includes performing all payment related functions within the Internet service provider network, allowing the user to access the content via the Internet service provider network.

2. The method of claim 1 wherein the one or more content-provider payment rules are regular expressions.

3. A method for providing access to a plurality of fee-based Internet content-providers, comprising:
   receiving, at an Internet service provider network, a request for a uniform resource locator (URL) corresponding to an address of a content-provider served via the Internet service provider network;
   determining, by a controller in the Internet service provider network, that the URL matches at least one regular expression rule in a database maintained by the Internet service provider network;
   identifying, by the controller in the Internet service provider network, a user associated with the request;
   wherein determining includes:
      mapping the URL in a string domain to a point in a spatial domain; and
      after determining that the point is within a region associated with the at least one regular expression rule, comparing in the string domain the URL with the at least one regular expression rule to determine the URL matches the at least one regular expression rule;
   forwarding the request to a payment authority operated within the Internet service provider network for evaluation of payment status;
   determining, by the payment authority, a prior authorization for payment for a content has been made by the user; and
   after determining the prior authorization for payment includes performing all payment related functions within the Internet service provider network, allowing the user to access the content via the Internet service provider network.

* * * * *